United States Patent
Gunn, III et al.

(10) Patent No.: US 7,231,105 B2
(45) Date of Patent: Jun. 12, 2007

(54) INTEGRATED DUAL WAVEGUIDES

(75) Inventors: Lawrence C. Gunn, III, Altadena, CA (US); Thierry J. Pinguet, Pasadena, CA (US); Maxime Jean Rattier, Pasadena, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 11/384,227

(22) Filed: Mar. 17, 2006

(65) Prior Publication Data
US 2007/0009196 A1 Jan. 11, 2007

Related U.S. Application Data

(63) Continuation of application No. 10/600,804, filed on Jun. 19, 2003, now Pat. No. 7,027,673.

(60) Provisional application No. 60/389,845, filed on Jun. 19, 2002, provisional application No. 60/390,047, filed on Jun. 19, 2002.

(51) Int. Cl.
*G02B 6/12* (2006.01)

(52) U.S. Cl. ............................ 385/14; 385/11; 385/37; 385/45

(58) Field of Classification Search ............ 385/11–14, 385/24, 31, 32, 36, 37, 45–48
See application file for complete search history.

(56) References Cited

U.S. PATENT DOCUMENTS

| | | | | |
|---|---|---|---|---|
| 4,752,120 A | * | 6/1988 | Shimizu | 359/239 |
| 4,772,084 A | * | 9/1988 | Bogert | 385/40 |
| 5,056,883 A | * | 10/1991 | Diemeer et al. | 385/8 |
| 5,524,156 A | * | 6/1996 | Van Der Tol | 385/28 |
| 2003/0002127 A1 | | 1/2003 | George | |

* cited by examiner

*Primary Examiner*—Quyen Leung
(74) *Attorney, Agent, or Firm*—Knobbe, Martens, Olson & Bear, LLP

(57) ABSTRACT

An apparatus and method for splitting a received optical signal into its orthogonal polarizations and sending the two polarizations on separate dual integrated waveguides to other systems on chip for further signal processing. The present invention provides an apparatus and method for facilitating the processing of optical signals in planar waveguides received from optical fibers.

15 Claims, 2 Drawing Sheets

INTEGRATED DUAL WAVEGUIDES

CROSS-REFERENCE TO RELATED APPLICATIONS

This application claims priority from U.S. Provisional applications No. 60/389,845 filed Jun. 19, 2002 and No. 60/390,047 filed Jun. 19, 2002.

This is a continuation application based on application Ser. No. 10/600,804, filed Jun. 19, 2003, now U.S. Pat. No. 7,027,673, the entirety of which is incorporated herein by reference.

FIELD OF THE INVENTION

The present invention relates to an apparatus and method for facilitating the processing of optical signals from single mode optical fibers by integrated circuits.

BACKGROUND OF THE INVENTION

Optical fibers have been widely used for the propagation of optical signals, especially to provide high speed communications links. Optical links using fiber optics have many advantages compared to electrical links: large bandwidth, high noise immunity, reduced power dissipation and minimal crosstalk. Optical signals carried by optical fibers are processed by a wide variety of optical and optoelectronic devices, including integrated circuits. Optical communications signals in optical fibers are typically in the 1.3 μm and 1.55 μm infrared wavelength bands. Optoelectronic integrated circuits made of silicon are highly desirable since they can be fabricated at low cost in the same foundries used to make VLSI integrated circuits. The optical properties of silicon are well suited for the transmission of optical signals, due to its transparency in the infrared wavelength bands of 1.3 μm and 1.55 μm and its high refractive index. As a result, low loss planar silicon optical waveguides have been successfully built in silicon integrated circuits.

Optical signals traveling in optical fiber frequently need to be coupled to optoelectronic circuits and this can be done through a variety of known techniques and devices. There are many advantages to directly coupling optical signals on fiber with integrated optoelectronic silicon based circuits. The flat end of an optical fiber can be directly connected to the edge of a silicon integrated circuit, so the optical signal can be coupled to a flat end of a planar waveguide. An optical signal in a fiber can be coupled to a planar waveguide through the top surface of an integrated circuit using a grating coupler. The efficiency of such fiber to chip connections depends on many factors, including the number and types of optical modes in the fiber and in the integrated waveguide. Once an optical signal is on a chip, it can be processed either as an optical signal or converted to an electronic signal for further processing.

An optical beam traveling in a single mode fiber (SMF) with circular cross section will typically have two optical modes, with one mode polarized in the x direction and a second mode polarized in the y direction. These two orthogonal polarizations have approximately the same propagation constant and approximately the same group velocity. Some refer to these two modes as a single mode with two polarization components. Within this discussion of the present invention, the two orthogonal polarizations are referred to as two modes.

Similarly, two orthogonal polarization modes are preset in standard forms of polarization maintaining fibers. These two modes have sufficiently different phase and group velocities to prevent light from coupling back and forth between the two modes. However, the differences are slight enough that they can usually be treated in a similar manner to SMF, when used as an input to polarization splitting elements.

In theory and under ideal conditions, there is no exchange of power between the orthogonal polarizations. If an optical signal is directed into only one polarization, then all the power should remain in that polarization. But in actual practice, imperfections or strains in the fiber cause random power transfer between the two polarizations. The total power is thus divided between the two polarizations, and this may not be a problem in some applications, but in many situations, this can be a major problem. In some cases, there can be a great deal of fluctuation and power transfer between the two polarizations. Such random fluctuations could cause the power delivered on one polarization, to be close to zero, which would result in some loss of signal, if only that polarization is being received.

Single mode optical fiber with a circular cross section has two optical modes, although due to the rotational invariance of a single mode fiber, one mode is difficult to describe without referencing the presence of the other. Planar waveguides have a different type of modal configuration, where there are two primary types of modes: the transverse electric (TE) and the transverse magnetic (TM), which describe which field of the mode is oriented purely transversely to the direction of propagation. This is strictly true only for 2 dimensional ideal waveguides, however this naming convention is also used for real world three dimensional waveguides, which are only approximately TE or TM. Future references herein will make the common assumption that quasi-TE or quasi-TM modes are understood as TE or TM modes.

It is difficult to connect an optical signal from an optical fiber to a planar waveguide due to differences in: cross sectional geometry, polarization characteristics and the number of optical modes. An SMF optical fiber has a circular cross section with a core diameter of less than ten microns. A nanophotonic planar waveguide can be substantially smaller, and as a result, contain modes that vary substantially in cross-sectional geometry. An SMF fiber will typically have two polarizations with essentially the same phase and group velocities. The polarizations in a planar waveguide can have very different phase and group velocities, or the planar waveguide could support only a single polarization mode. The number of optical modes in an SMF fiber is two when operated at the appropriate wavelength. A typical planar waveguide can have many optical modes within it, or it could have only one, depending on the design.

Waveguides are designed for use over a particular wavelength range, so a single mode waveguide at one wavelength very often becomes multimodal at substantially shorter wavelengths. When one skilled in the art refers to waveguide operation, it is commonly understood that a particular wavelength range is being referenced with respect to single or multimode operation.

The design process for optical paths comprises construction of maskworks. Maskworks include shapes, layout, data structures, netlists, and alignment marks and other elements of the design which are typically stored as digital data on a computer system. In addition, these electronic representations of the designs are transferred to a set of many physical masks which are used during the fabrication of the components. These many masks are included in the definition of maskworks.

As a result of the many differences in characteristics between optical fibers and planar waveguides, it has been difficult to connect optical signals from one to the other.

SUMMARY OF THE INVENTION

One embodiment of the present invention is an apparatus and method for splitting a received optical signal into its orthogonal polarizations and sending the two polarizations on separate dual integrated single mode waveguides to other systems on chip for further signal processing. The present invention provides an apparatus and method for facilitating the processing of optical signals in planar waveguides received from optical fibers.

DETAILED DESCRIPTION

Figure 1:
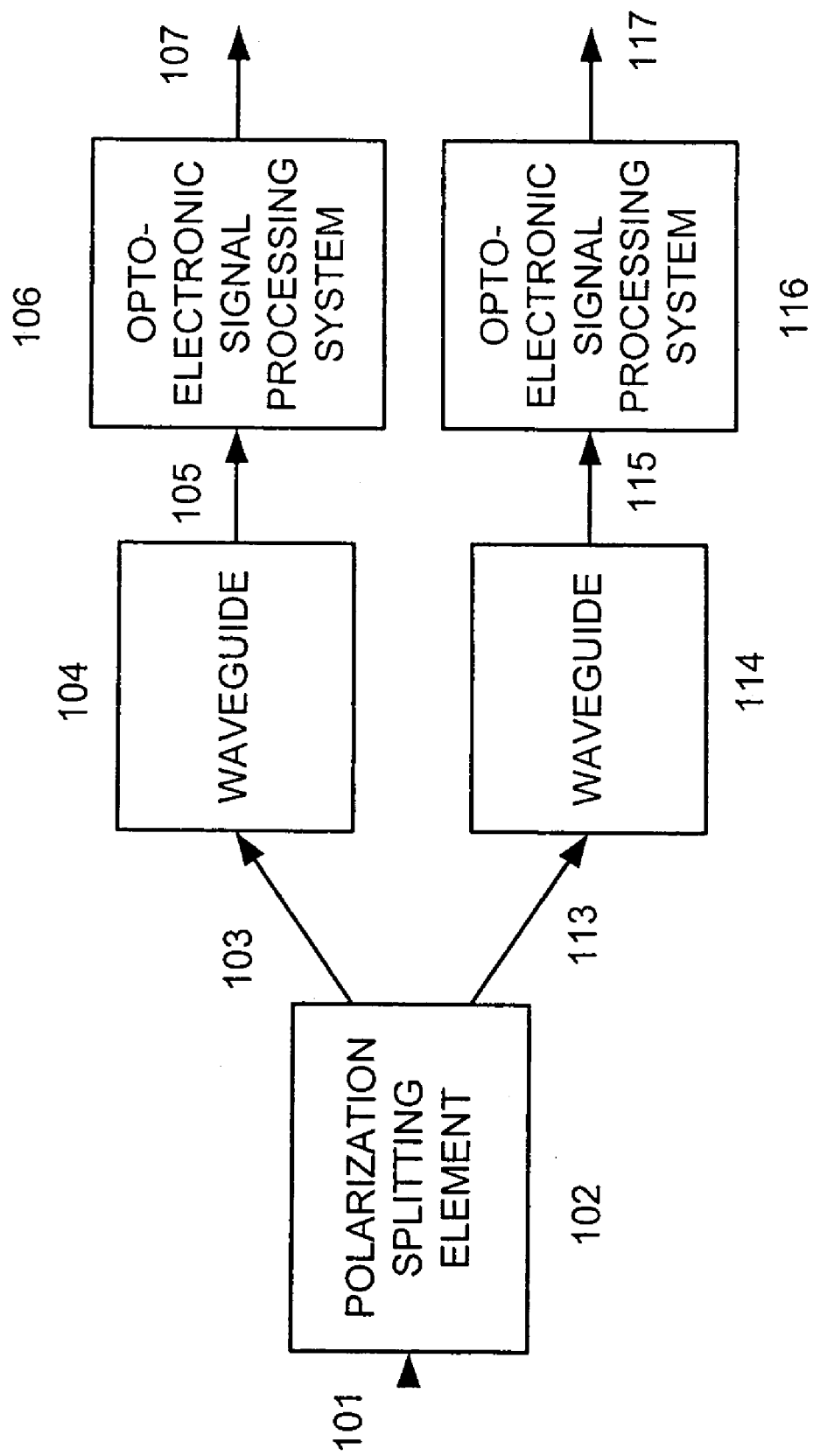
FIG. 1 is a block diagram of an apparatus, according to one embodiment of the present invention.

FIG. 1 is a block diagram of an apparatus, according to one embodiment of the present invention. Optical signal 101 is input to polarization splitting element 102. Polarization splitting element 102 splits the received optical signal into two orthogonal polarizations or modes which are sent to output ports as output signals 103 and 113.

Output signal 103 is sent to the input of waveguide 104. The optical signal received by the waveguide 104 propagates through it and appears as output signal 105. Output signal 105 is input to optoelectronic signal processing system 106, which processes the received signal and generates output 107.

Output signal 113 is sent to the input of waveguide 114. The optical signal received by the waveguide 114 propagates through it and appears as output signal 115. Output signal 115 is input to optoelectronic signal processing system 116, which processes the received signal and generates output 117.

Waveguides 104 and 114 are fabricated as identical waveguides within the limitations of the particular semiconductor processing technology used to make them. The two waveguides are of the same length, width and height and made of the same materials, during the same semiconductor processing steps. To minimize differences in the waveguides due to local variations in an integrated circuit, the waveguides 104 and 114 can be fabricated in close proximity to each other on the same integrated circuit. In an exemplary embodiment, the waveguides 104 and 114 are no more than five microns apart. Just as matched transistors on an integrated circuit have to be built in close proximity to each other, the waveguides 104 and 114 have to be fabricated close together in order to be considered a matched pair of waveguides.

In one embodiment, the polarization splitting element and the two waveguides are disposed on the same integrated circuit. In an alternate embodiment, the two waveguides are disposed on the same integrated circuit.

If we consider waveguides 104 and 114 as identical waveguides, then their operating characteristics would be identical. Two optical modes propagated separately through the two waveguides will encounter the same optical environment, and any change in the two signals due to the waveguides will be the same. Optoelectronic signal processing systems 106 and 116 are also designed to be identical in operation, and have the same impact on the two separate optical modes. Systems 106 and 116 can be any of a general type of signal processing systems, which can process signals optically, electronically or optoelectronically. The two identical signal processing systems can be any one of the following types of devices, such as: photodetectors, filters, modulators, demodulators, amplifiers, pulse shapers, multiplexers, demultiplexers, etc., and other kinds of signal processors. The two identical signal processing systems can be output devices, such as chip to fiber couplers. In an alternate embodiment, the two systems 106 and 116 can be replaced by one signal processing system with two input ports and one output port.

The outputs of the two signal processing systems can be combined together to generate a single output signal.

Thus, the two modes can travel down paths, which are very similar before independently reaching the signal processing system, and the sum of the effects of the identical waveguides can be expected to produce a nearly polarization independent effect.

A matched pair of optical waveguides can have two basic forms. In the first form, they are exactly identical copies of each other, placed along the same orientation, in proximity to each other. The second form is where the two copies are mirror images of each other, along some line in plane with the substrate, and the two copies are in proximity to each other.

A particularly advantageous aspect of the present invention is that splitting the optical input signal into its two orthogonal polarizations and processing the two polarizations in an identical manner enables the two planar waveguides operating together to receive an optical signal without being adversely affected by the polarization characteristics of the optical waveguide.

When waveguides are fabricated, there are two main sources of fabrication error: film thickness and etch process variation. Both of these two effects are dependent on the distance between two structures that are desired to be identical. The proper distance is best quantified with a number called the autocorrelation length of the variable. The autocorrelation length is a distance over which one thickness, for example, is known to be correlated to another, and beyond this distance, the relative thicknesses become increasingly non-deterministic. This autocorrelation function is well known to those skilled in the art, and can also be applied to the variations in process bias that create asymmetries between waveguides or optical circuits. A particularly relevant way to express the effects of a combination of effects, each with their own autocorrelation length is to combine them as a number representing the autocorrelation length of the phase of the optical signal.

Figure 2:
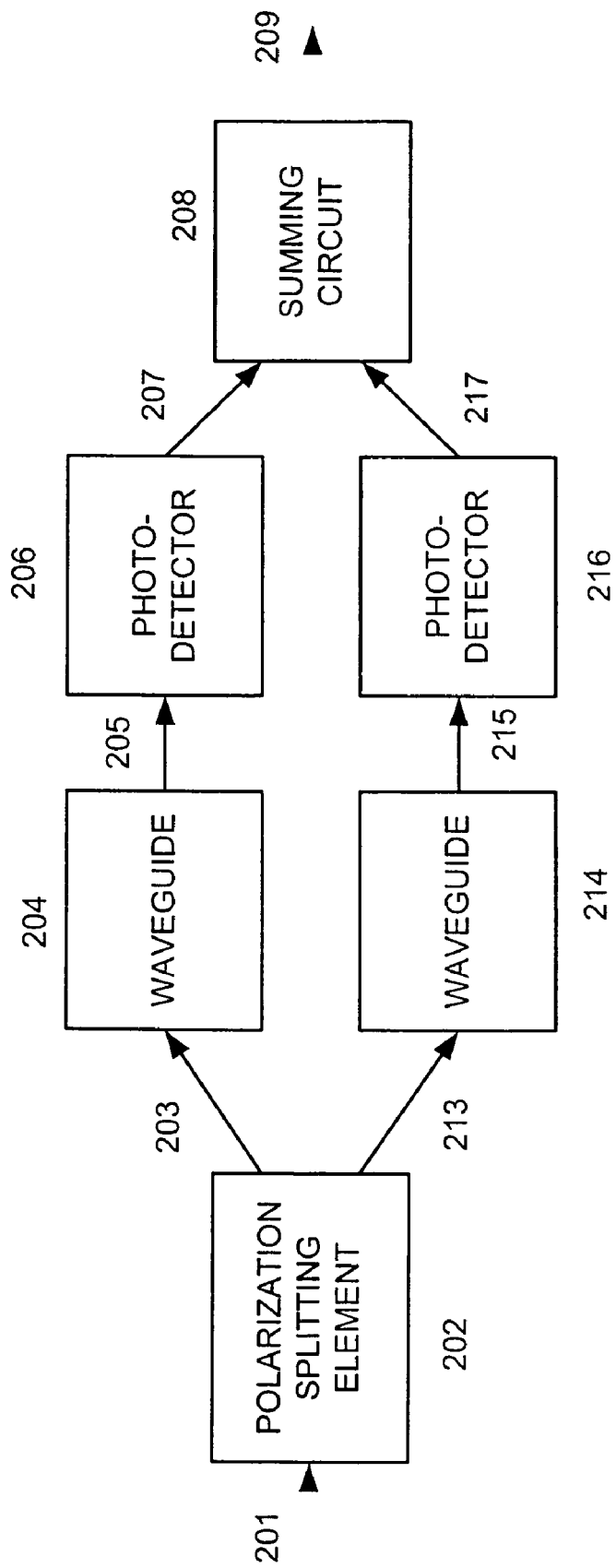
FIG. 2 is a block diagram of an apparatus, according to an alternate embodiment of the present invention.

FIG. 2 is a block diagram of an apparatus, according to one embodiment of the present invention. Optical signal 201 is input to polarization splitting element 202. Polarization splitting element 202 splits the received optical signal into two orthogonal polarizations or modes which are sent to output ports as output signals 203 and 213.

Output signal 203 is sent to the input of waveguide 204. The optical signal received by the waveguide 204 propagates through it and appears as output signal 205. Output signal 205 is input to photodetector 206, which processes the received signal and generates electrical output signal 207.

Output signal 213 is sent to the input of waveguide 214. The optical signal received by the waveguide 214 propagates through it and appears as output signal 215. Output signal 215 is input to photodetector 216, which processes the received signal and generates electrical output signal 217.

Electrical output signals 207 and 217 can be combined together by summing circuit 208 to generate electrical output signal 209. In an alternate embodiment, the summing circuit 208 and the two photodetectors 206 and 216 can be replaced by one photodetector with two input ports and one output port.

A particularly advantageous aspect of the present invention is the generation of an electrical output signal which corresponds to the total power of the two polarizations of the optical input signals, regardless of how the power is randomly transferred between the two polarizations.

Although the present invention has been described in detail, it should be understood that various changes, substitutions and alterations can be made without departing from the spirit and scope of the invention.

We claim:

1. An optical apparatus comprising:
    a polarization splitting element, with an input port and first and second output ports, where the polarization splitting element splits the orthogonal components of a received input signal into first and second output signals directed to the respective first and second output ports,
    a first waveguide with an input port and an output port, where the input port is coupled to the first output port of the polarization splitting element, and
    a second waveguide with an input port and an output port, where the input port is coupled to the second output port of the polarization splitting element, where the first and second waveguides have substantially the same waveguiding properties and the second waveguide is disposed less than one autocorrelation length from the first waveguide.

2. An optical apparatus according to claim 1, wherein the polarization splitting element splits the orthogonal components of the received input signal into substantially identically polarized first and second output signals directed to the respective first and second output ports.

3. An optical apparatus according to claim 1, and further comprising:
    a first signal processing system having an input port coupled to the output of the first waveguide, and
    a second signal processing system having an input port coupled to the output of the second waveguide,
    where the first and second signal processing systems are substantially identical and where the second signal processing system is adjacent to the first signal processing system on a substrate.

4. An optical apparatus according to claim 3, wherein each of the first and second signal processing systems is comprised of one of the following:
    a plurality of wavelength demultiplexers,
    a plurality of modulators,
    and a group comprised of:
        a plurality of photodetectors and
        a plurality of transistors.

5. An optical apparatus according to claim 3, wherein each of the first and second signal processing systems is comprised of a wavelength dependent filter with a plurality of outputs that impinge on a plurality of photodetectors, and where the signals from the first signal processing system and second signal processing system are processed in the electronic domain to generate a signal that does not exhibit polarization dependence.

6. An optical apparatus comprising:
    a polarization splitting element, with an input port and first and second output ports, wherein the polarization splitting element splits the orthogonal components of a received input signal into first and second output signals directed to the respective first and second output ports,
    a first waveguide having an input port coupled to the first output port of the polarization splitting element and a second waveguide having an input port coupled to the second output port of the polarization splitting element, the first and second waveguides having substantially the same waveguiding properties and the second waveguide being adjacent to the first waveguide on a substrate, and
    first and second signal processing systems, the first signal processing system having an input port coupled to an output port of the first waveguide and the second signal processing system having an input port coupled to an output port of the second waveguide, wherein the first and second signal processing systems are monolithically fabricated adjacent one another on a silicon substrate.

7. An optical apparatus comprising:
    a polarization splitting element, with an input port and first and second output ports, where the polarization splitting element splits the orthogonal components of a received input signal into first and second output signals directed to the respective first and second output ports,
    a first waveguide having an input port coupled to the first output port of the polarization splitting element and a second waveguide having an output port coupled to the second output port of the polarization splitting element, the first and second waveguides having substantially the same waveguiding properties, the second waveguide being adjacent to the first waveguide on a substrate, and
    first and second signal processing systems, the first signal processing system having an input port coupled to an output port of the first waveguide and the second signal processing system having an input port coupled to an output port of the second waveguide, wherein the first and second signal processing systems are monolithically fabricated adjacent one another on a single silicon on insulator (SOI) substrate.

8. An optical apparatus according to claim 1, wherein the polarization splitting element and the first and second waveguides are disposed on a single substrate.

9. An optical apparatus according to claim 1, wherein the first and second waveguides each support only a single mode of a single polarization.

10. An optical apparatus according to claim 9, wherein the first and second waveguides each support only a TE mode.

11. An optical apparatus according to claim 9, wherein the first and second waveguides each support only a TM mode.

12. An optical apparatus according to claim 1, wherein the first and second waveguides are oriented along the same propagation axis.

13. An optical apparatus according to claim 1, wherein the second waveguide is disposed no more than about 5 microns from the first waveguide.

14. An optical apparatus according to claim 1, wherein the first and second waveguides have substantially the same width, height, and material composition.

15. An optical apparatus according to claim 14, wherein the first and second waveguides are located on a substrate in sufficiently close proximity to diminish fabrication-process-induced differences but are configured to allow for substantially separate and independent propagation of signals through the first and second waveguides.

* * * * *